(12) United States Patent
Cogliandro et al.

(10) Patent No.: US 12,335,594 B2
(45) Date of Patent: Jun. 17, 2025

(54) SINGLE CAMERA TIME-DELAY TO ENFORCE DATA TRANSMISSION COMPLIANCE IN REAL AND NEAR REAL TIME VIDEO

(71) Applicant: Raytheon Company, Arlington, VA (US)

(72) Inventors: John A. Cogliandro, Dedham, MA (US); Matthew J. Tacy, Boston, MA (US); Allan Mayorga, Salem, MA (US)

(73) Assignee: Raytheon Company, Arlington, VA (US)

( * ) Notice: Subject to any disclaimer, the term of this patent is extended or adjusted under 35 U.S.C. 154(b) by 16 days.

(21) Appl. No.: 18/134,852

(22) Filed: Apr. 14, 2023

(65) Prior Publication Data

US 2023/0262316 A1    Aug. 17, 2023

Related U.S. Application Data

(63) Continuation-in-part of application No. 17/507,073, filed on Oct. 21, 2021, now Pat. No. 11,792,499.

(51) Int. Cl.
*H04N 23/61* (2023.01)
*G06F 21/60* (2013.01)
(Continued)

(52) U.S. Cl.
CPC .......... *H04N 23/61* (2023.01); *G06F 21/606* (2013.01); *G06T 7/20* (2013.01); *G06V 20/40* (2022.01); *H04N 7/04* (2013.01); *H04N 21/23418* (2013.01); *H04N 23/64* (2023.01); *H04N 23/695* (2023.01)

(58) Field of Classification Search
None
See application file for complete search history.

(56) References Cited

U.S. PATENT DOCUMENTS

| 4,992,883 A | 2/1991 | Tsunekawa |
| 5,594,469 A | 1/1997 | Freeman et al. |
| (Continued) |

FOREIGN PATENT DOCUMENTS

| CA | 3076505 | 2/2024 | |
| CN | 102244807 A | * 11/2011 | ..... H04N 21/234318 |
| (Continued) |

OTHER PUBLICATIONS

"Taiwanese Application Serial No. 111136376, Response Filed Jul. 25, 2023 to Office Action mailed Apr. 26, 2023", With English Machine Translation, No Claim Amendments, 26 pgs.
(Continued)

*Primary Examiner* — Stefan Gadomski
(74) *Attorney, Agent, or Firm* — Schwegman Lundberg & Woessner, P.A.

(57) ABSTRACT

To prevent the transmission of excluded data, a short time-delay between capture and transmission of a video signal is exploited to process the buffered frames to recognize disallowed objects and control the video camera to prevent transmission of any frame including the disallowed object in the video signal. The time-delay can be implemented in real or near real time with, for example, a delay line or memory chip that serve to buffer the sequence of image frames.

19 Claims, 8 Drawing Sheets

(51) Int. Cl.
*G06T 7/20* (2017.01)
*G06V 20/40* (2022.01)
*H04N 7/04* (2006.01)
*H04N 21/234* (2011.01)
*H04N 23/60* (2023.01)
*H04N 23/695* (2023.01)

(56) References Cited

U.S. PATENT DOCUMENTS

| | | |
|---|---|---|
| 6,356,437 B1 | 3/2002 | Mitchell et al. |
| 6,970,183 B1 | 11/2005 | Monroe |
| 7,110,909 B2 | 9/2006 | Friedrich et al. |
| 7,126,558 B1 | 10/2006 | Dempski |
| 7,372,451 B2 | 5/2008 | Dempski |
| 7,596,240 B2 | 9/2009 | Ito et al. |
| 7,653,259 B2 | 1/2010 | Pilu |
| 8,432,559 B2 | 4/2013 | Kobayashi |
| 8,749,343 B2 | 6/2014 | Cirker |
| 9,179,105 B1 * | 11/2015 | Zeira .................. H04N 7/183 |
| 9,313,391 B1 | 4/2016 | Zhang et al. |
| 9,582,709 B2 | 2/2017 | Wang et al. |
| 10,089,790 B2 | 10/2018 | Lawson et al. |
| 10,122,825 B1 | 11/2018 | Petty |
| 10,142,410 B2 | 11/2018 | Giffin et al. |
| 10,403,046 B2 | 9/2019 | Pinti et al. |
| 10,425,403 B2 | 9/2019 | Chen et al. |
| 10,440,348 B2 | 10/2019 | Koppal et al. |
| 10,531,137 B1 | 1/2020 | Matak et al. |
| 10,602,054 B2 | 3/2020 | Jung et al. |
| 10,674,972 B1 | 6/2020 | Piatrou et al. |
| 10,679,425 B2 | 6/2020 | Pinti et al. |
| 10,878,584 B2 | 12/2020 | Agata et al. |
| 11,696,011 B2 | 7/2023 | Tacy et al. |
| 11,700,448 B1 | 7/2023 | Cogliandro et al. |
| 11,792,499 B2 | 10/2023 | Mayorga et al. |
| 2004/0233282 A1 | 11/2004 | Stavely et al. |
| 2005/0018879 A1 * | 1/2005 | Ito .................. H04N 7/183 |
| | | 348/E7.087 |
| 2008/0030575 A1 | 2/2008 | Davies et al. |
| 2010/0002071 A1 | 1/2010 | Ahiska |
| 2011/0130949 A1 | 6/2011 | Arrasvuori |
| 2011/0142369 A1 | 6/2011 | Aila et al. |
| 2011/0181716 A1 * | 7/2011 | McLeod ............. H04N 7/181 |
| | | 348/143 |
| 2012/0033098 A1 * | 2/2012 | Matsuyama ....... H04N 23/689 |
| | | 348/222.1 |
| 2012/0074296 A1 | 3/2012 | Hammes et al. |
| 2012/0087546 A1 * | 4/2012 | Focke ................ B60R 1/27 |
| | | 382/104 |
| 2012/0120309 A1 * | 5/2012 | Utagawa ........ H04N 21/234381 |
| | | 348/E7.003 |
| 2012/0203487 A1 | 8/2012 | Johnson et al. |
| 2013/0278778 A1 | 10/2013 | Kagei |
| 2014/0168184 A1 | 6/2014 | Burr |
| 2014/0210856 A1 | 7/2014 | Finn et al. |
| 2015/0186728 A1 | 7/2015 | Kimura |
| 2015/0208042 A1 * | 7/2015 | Jia .................. G06F 18/2185 |
| | | 348/143 |
| 2015/0302647 A1 | 10/2015 | Osterhout et al. |
| 2016/0026253 A1 | 1/2016 | Bradski et al. |
| 2016/0080642 A1 * | 3/2016 | Jung .................. H04N 5/772 |
| | | 386/227 |
| 2016/0080652 A1 | 3/2016 | Shirota et al. |
| 2016/0133054 A1 | 5/2016 | Honjo et al. |
| 2016/0273908 A1 | 9/2016 | Rose et al. |
| 2016/0335524 A1 | 11/2016 | Bremer et al. |
| 2016/0349228 A1 | 12/2016 | Kester et al. |
| 2016/0378939 A1 | 12/2016 | Baumberger et al. |
| 2017/0193279 A1 | 7/2017 | Kusens et al. |
| 2017/0213079 A1 | 7/2017 | Herger et al. |
| 2017/0273549 A1 | 9/2017 | Nazareth et al. |
| 2017/0323062 A1 | 11/2017 | Djajadiningrat et al. |
| 2017/0339295 A1 | 11/2017 | Honda |
| 2018/0043225 A1 | 2/2018 | Lau et al. |
| 2018/0092698 A1 | 4/2018 | Chopra et al. |
| 2018/0259673 A1 | 9/2018 | Cui et al. |
| 2018/0309808 A1 | 10/2018 | Andon et al. |
| 2018/0330096 A1 | 11/2018 | Breindel et al. |
| 2018/0330110 A1 | 11/2018 | Nelson et al. |
| 2018/0336737 A1 | 11/2018 | Varady et al. |
| 2018/0341812 A1 | 11/2018 | Floor et al. |
| 2019/0066403 A1 | 2/2019 | Nagura et al. |
| 2019/0088026 A1 | 3/2019 | Isaacson et al. |
| 2019/0122378 A1 | 4/2019 | Aswin |
| 2019/0122437 A1 | 4/2019 | Pinti et al. |
| 2019/0188930 A1 | 6/2019 | Tsukahara |
| 2019/0272677 A1 * | 9/2019 | Pinti .................. G06F 3/017 |
| 2019/0279019 A1 * | 9/2019 | Choi .................. G06T 13/40 |
| 2019/0335115 A1 | 10/2019 | Kumai |
| 2020/0082631 A1 | 3/2020 | Yoon et al. |
| 2020/0143643 A1 | 5/2020 | Kusens et al. |
| 2020/0174261 A1 | 6/2020 | Uenohara et al. |
| 2020/0210726 A1 * | 7/2020 | Yang .................. G06V 10/70 |
| 2020/0211348 A1 * | 7/2020 | Wang .................. H04N 23/61 |
| 2020/0334919 A1 | 10/2020 | Bowen |
| 2020/0394430 A1 | 12/2020 | Ahmed et al. |
| 2021/0070311 A1 | 3/2021 | Patychuk et al. |
| 2021/0224885 A1 | 7/2021 | Yarra et al. |
| 2022/0070453 A1 * | 3/2022 | Tang .................. H04N 19/136 |
| 2023/0128616 A1 | 4/2023 | Mayorga et al. |
| 2023/0131642 A1 | 4/2023 | Tacy et al. |
| 2023/0177717 A1 * | 6/2023 | Tank .................. H04N 23/51 |
| | | 382/103 |

FOREIGN PATENT DOCUMENTS

| | | | |
|---|---|---|---|
| CN | 106228544 A | 12/2016 | |
| CN | 113168676 A | 7/2021 | |
| CN | 114419720 A | 4/2022 | |
| EP | 3599607 A1 * | 1/2020 | ......... G06K 9/00711 |
| EP | 3920007 | 7/2023 | |
| JP | 2000032473 | 1/2000 | |
| JP | 2000092473 A * | 3/2000 | |
| JP | 2000228741 A | 8/2000 | |
| JP | 2004179971 | 6/2004 | |
| JP | 2006025250 A | 1/2006 | |
| JP | 2006293605 A | 10/2006 | |
| JP | 2011097238 A | 5/2011 | |
| JP | 2015126352 A | 7/2015 | |
| JP | 2016167688 A | 9/2016 | |
| JP | 2017108263 A | 6/2017 | |
| JP | 2017529635 A | 10/2017 | |
| JP | 2017533484 | 11/2017 | |
| JP | 2019165431 | 9/2019 | |
| JP | 2021118499 A * | 8/2021 | |
| JP | 7258084 B2 | 4/2023 | |
| KR | 102123248 | 6/2020 | |
| KR | 102123248 B1 * | 6/2020 | |
| TW | 202318855 | 5/2023 | |
| TW | 202318856 | 5/2023 | |
| TW | 202343371 | 11/2023 | |
| WO | WO-2010094065 A1 | 8/2010 | |
| WO | WO-2015170409 A1 | 11/2015 | |
| WO | 2016208102 | 12/2016 | |
| WO | WO-2017027338 A1 | 2/2017 | |
| WO | WO-2017177019 A1 | 10/2017 | |
| WO | WO-2017204081 A1 | 11/2017 | |
| WO | 2020065301 | 4/2020 | |
| WO | WO-2023069511 | 4/2023 | |
| WO | WO-2023069527 | 4/2023 | |
| WO | 2023212040 | 11/2023 | |

OTHER PUBLICATIONS

"Taiwanese Application Serial No. 111136376, Office Action mailed Nov. 27, 2023", With English Machine Translation, 27 pgs.
"Taiwanese Application Serial No. 111136376, Response filed Feb. 1, 2024 to Office Action mailed Nov. 27, 2023", With English Machine Translation, 18 pgs.
"Taiwanese Application Serial No. 111136376, Response Filed Jan. 17, 2024 to Office Action mailed Dec. 15, 2023", With English Machine Translation, 18 pgs.

(56) References Cited

OTHER PUBLICATIONS

"U.S. Appl. No. 17/507,073, Notice of Allowance mailed Mar. 22, 2023", 8 pgs.
"U.S. Appl. No. 17/507,073, Notice of Allowance mailed Dec. 22, 2022", 10 pgs.
"U.S. Appl. No. 17/507,073, Supplemental Notice of Allowability mailed Jan. 5, 2023", 2 pgs.
"U.S. Appl. No. 17/507,111, Non Final Office Action mailed Nov. 25, 2022", 20 pgs.
"U.S. Appl. No. 17/507,111, Notice of Allowance mailed Apr. 7, 2023", 8 pgs.
"U.S. Appl. No. 17/507,111, Response filed Jan. 23, 2023 to Non Final Office Action mailed Nov. 25, 2022", 16 pgs.
"U.S. Appl. No. 17/733,456, Ex Parte Quayle Action mailed Apr. 7, 2023", 9 pgs.
"U.S. Appl. No. 17/733,456, Notice of Allowance mailed May 10, 2023", 9 pgs.
"U.S. Appl. No. 17/733,456, Response filed Apr. 21, 2023 to Ex Parte Quayle Action mailed Apr. 7, 2023", 10 pgs.
"Canadian Application Serial No. 3076505, Examiners Rule 86(2) Report mailed May 5, 2023", 3 pgs.
"Canadian Application Serial No. 3076505, Office Action mailed Dec. 16, 2022", 5 pgs.
"Canadian Application Serial No. 3076505, Response Filed Dec. 20, 2022 to Office Action mailed Dec. 16, 2022", 7 pgs.
"Canadian Application Serial No. 3076505, Voluntary Amendment filed Apr. 28, 2020", 11 pgs.
"Canadian Application Serial No. 3076505, Voluntary Amendment Filed Dec. 21, 2022", 12 pgs.
"European Application Serial No. 18789290.6, Communication Pursuant to Article 94(3) EPC mailed Jan. 20, 2021", 7 pgs.
"European Application Serial No. 18789290.6, Response filed May 7, 2021 to Communication Pursuant to Article 94(3) EPC mailed Jan. 20, 2021", 21 pgs.
"European Application Serial No. 21188467.1, Extended European Search Report mailed Nov. 2, 2021", 9 pgs.
"European Application Serial No. 21188467.1, Response filed Jan. 7, 2022 to Extended European Search Report mailed Nov. 2, 2021", 16 pgs.
"International Application Serial No. PCT/US2018/052626, Written Opinion mailed Dec. 7, 2018", 9 pgs.
"International Application Serial No. PCT/US2018/052626, International Preliminary Report on Patentability mailed Apr. 21, 2020", 10 pgs.
"International Application Serial No. PCT/US2018/052626, International Search Report mailed Dec. 7, 2018", 4 pgs.
"International Application Serial No. PCT/US2022/047126, International Search Report mailed Mar. 24, 2023", 6 pgs.
"International Application Serial No. PCT/US2022/047126, Invitation to Pay Additional Fees mailed Feb. 1, 2023", 12 pgs.
"International Application Serial No. PCT/US2022/047126, Written Opinion mailed Mar. 24, 2023", 10 pgs.
"International Application Serial No. PCT/US2022/047144, International Search Report mailed Mar. 23, 2023", 6 pgs.
"International Application Serial No. PCT/US2022/047144, Invitation to Pay Additional Fees mailed Jan. 31, 2023", 15 pgs.
"International Application Serial No. PCT/US2022/047144, Written Opinion mailed Mar. 23, 2023", 13 pgs.
"Japanese Application Serial No. 2021-112687, Notification of Reasons for Refusal mailed Aug. 2, 2022", w/ English Translation, 6 pgs.
"Japanese Application Serial No. 2021-112687, Response filed Oct. 31, 2022 to Notification of Reasons for Refusal mailed Aug. 2, 2022", with English translation of claims, 10 pgs.
"Korean Application Serial No. 10-2020-7007808, Notice of Preliminary Rejection mailed Nov. 30, 2021", w/ English translation, 5 pgs.
"Korean Application Serial No. 10-2020-7007808, Response filed Jan. 25, 2022 to Notice of Preliminary Rejection mailed Nov. 30, 2021", with machine translation, 24 pgs.
"Korean Application Serial No. 10-2020-7007808, Voluntary Amendment filed May 21, 2020", with English translation of claims, 29 pgs.
"Kuwait Application Serial No. KW/P/2020/138, Office Action mailed Dec. 27, 2022", 5 pgs.
"Kuwaiti Application Serial No. KW/P/2020/138, Response Filed Feb. 9, 2023 to Office Action mailed Dec. 27, 2022", W/ English Claims, 4 pgs.
"Saudi Arabian Application Serial No. 520411721, Office Action mailed Mar. 28, 2023", W/English Translation, 11 pgs.
"Taiwanese Application Serial No. 111136376, Office Action mailed Apr. 26, 2023", with machine translation, 21 pgs.
"XMReality 4.4 Manual, XMReality Remote Guidance, "Like Being There" XMReality AB", XMReality AB, (2015), 49 pages.
Henderson, Steven, et al., "Augmented Reality for Maintenance and Repair (ARMAR)", Air Force Research Laboratory Human Effectiveness Directorate Warfighter Readiness Research Division Logistics Readiness Branch Wright-Patterson AFB OH 45433-7604, (Aug. 2007), 70 pages.
Henderson, Steven, et al., "Evaluating the Benefits of Augmented Reality for Task Localization in Maintenance of an Armored Personnel Carrier Turret", IEEE International Symposium on Mixed and Augmented Reality 2009 Science and Technology Proceedings, (Oct. 19-22, 2009), 10 pgs.
Molineros, Jose, et al., "Computer vision for guiding manual assembly", Proceedings of the 2001 IEEE International Symposium on Assembly and Task Planning, (May 29-29, 2001), 7 pages.
Reiners, Dirk, et al., "Augmented Reality for Construction Tasks: Doorlock Assembly", IWAR, (Nov. 1998), 10 pgs.
Smith, Randall, et al., "Estimating Uncertain Spatial Relationships in Robotics", Machine Intelligence and Pattern Recognition 1, (Jan. 1986), 435-461.
Tang, Arthur, et al., "Comparative Effectiveness of Augmented Reality in Object Assembly", Paper: New Techniques for Presenting Instructions and Transcripts CHI 2003: New Horizons, (Apr. 5-10, 2003), 8 pages.
Vollmer, Michael, et al., "High speed and slow motion: the technology of modern high speed cameras", Physics Education, Institute of Physics Publishing, Bristol, GB, vol. 46, No. 2, (Mar. 3, 2011), 191-202.
"Canadian Application Serial No. 3076505, Response Filed May 10, 2023 to Examiners Rule 86(2) Report mailed May 5, 2023", 21 pgs.
"U.S. Appl. No. 17/507,073, Notice of Allowance mailed Jun. 27, 2023", 9 pgs.
"International Application Serial No. PCT US2023 019962, International Search Report mailed Jul. 20, 2023", 3 pgs.
"International Application Serial No. PCT US2023 019962, Written Opinion mailed Jul. 20, 2023", 8 pgs.
"European Application Serial No. 22806066.1, Response filed Nov. 7, 2024 to Response to Communication pursuant to Rules 161(1) and 162 EPC", 20 pgs.
"European Application Serial No. 22809569.1, Response filed Nov. 13, 2024 to Communication pursuant to Rules 161(1) and 162 EPC mailed May 28, 2024", 58 pgs.
"International Application Serial No. PCT/US2022/047126, International Preliminary Report on Patentability mailed May 2, 2024", 12 pgs.
"International Application Serial No. PCT/US2022/047144, International Preliminary Report on Patentability mailed May 2, 2024", 15 pgs.
"International Application Serial No. PCT/US2023/019962, International Preliminary Report on Patentability mailed Nov. 7, 2024", 10 pgs.
"International Application Serial No. PCT/US2024/024084, International Search Report mailed Aug. 22, 2024", 5 pgs.
"International Application Serial No. PCT/US2024/024084, Written Opinion mailed Aug. 22, 2024", 7 pgs.
"International Application Serial No. PCT/US2024/024086, International Search Report mailed Aug. 22, 2024", 4 pgs.
"International Application Serial No. PCT/US2024/024086, Written Opinion mailed Aug. 22, 2024", 6 pgs.

(56) References Cited

OTHER PUBLICATIONS

"Taiwanese Application Serial No. 112113919, Office Action mailed Oct. 25, 2024", With English Machine Translation, 49 pgs.

U.S. Appl. No. 15/907,853 U.S. Pat. No. 10,403,046, filed Feb. 28, 2018, Field of View (FOV) and Key Code Limited Augmented Reality (AR) to Enforce Data Capturie of Transmission Compliance.

U.S. Appl. No. 16/416,939 U.S. Pat. No. 10,679,425, filed May 20, 2019, Field of View (FOV) and Key Code Limited Augmented Reality (AR) to Enforce Data Capturie and Transmission Compliance.

U.S. Appl. No. 17/507,073, filed Oct. 21, 2021, Time-Delay to Enforce Data Capture and Transmission Compliance in Real and Near Real Time Video.

U.S. Appl. No. 17/507,111, filed Oct. 21, 2021, Predictive Field-Of-View (FOV) and Cueing to Enforce Data Capture and Transmission Compliance in Real and Near Real Time Video.

U.S. Appl. No. 17/733,456, filed Apr. 29, 2022, Computer/Human Generation, Validation and Use of a Ground Truth Map to Enforce Data Capture and Transmission Compliance in Real and Near Real Time Video of a Local Scene.

U.S. Appl. No. 18/136,680, filed Apr. 19, 2023, Enforcement of Offline and Real Time Data Capture and Transmission Compliance Using a Ground Truth Map (GTM).

"Taiwanese Application Serial No. 112113919, Response filed Dec. 24, 2024 to Office Action mailed Oct. 25, 2024", w current English claims, 43 pgs.

"Taiwanese Application Serial No. 113113258, Office Action mailed Jan. 9, 2025", With English Machine Translation, 27 pgs.

"Taiwanese Application Serial No. 113113257, Office Action mailed Jan. 8, 2025", W English Translation, 11 pgs.

"Japanese Application Serial No. 2024-523576, Notification of Reasons for Refusal mailed Feb. 12, 2025", With English Machine Translation, 14 pgs.

\* cited by examiner

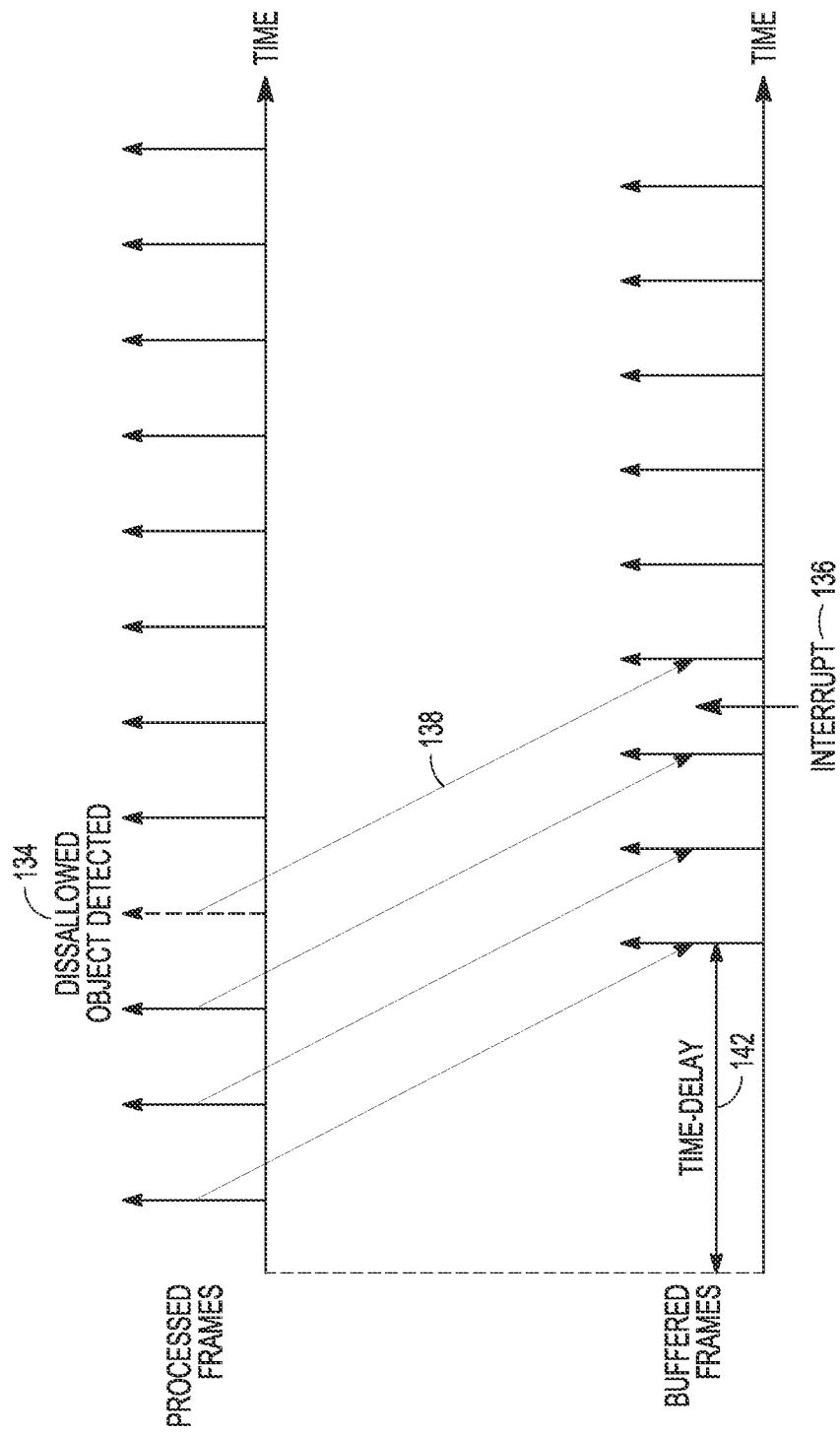

SINGLE CAMERA TIME-DELAY TO ENFORCE DATA TRANSMISSION COMPLIANCE IN REAL AND NEAR REAL TIME VIDEO

CROSS-REFERENCE TO RELATED APPLICATIONS

This application is a continuation-in-part and claims priority to U.S. Pat. No. 17,507,073 entitled "TIME-DELAY TO ENFORCE DATA CAPTURE AND TRANSMISSION COMPLIANCE IN REAL AND NEAR REAL TIME VIDEO" and filed on Oct. 21, 2021, the entire contents of which are incorporated by reference.

BACKGROUND

Field

This application relates to the capture and processing of video to enforce data transmission compliance in real or near real-time private, restrictive or secure environments.

Description of the Related Art

Video camera technology is increasingly ubiquitous in the world today. Devices such as head-mounted cameras, robotically controlled cameras, semi-autonomous or autonomous robots, cellular telephones, desktop or table computers, near-eye displays and hand-held game systems, for example, may include cameras and associated software to enable video capture, display and transmission. These devices are being used to provide unidirectional or bi-directional video communication in real or near real time. Privacy and security concerns exists when, intentionally or unintentionally, video that should not be captured, stored, displayed or transmitted is. A person's, company's or country's privacy may be violated, possibly illegally. In certain restrictive, such as military or company proprietary or secure environments, strict controls exist governing what visual information may be captured, stored, displayed or transmitted.

In an effort to restrict unwanted video capture or transmission, some existing systems monitor the video as it is captured. These systems use human processing, artificial intelligence (AI), computational algorithms, or a combination thereof to identify problematic visual information (e.g. a person's face or a company's proprietary information) and then either removes or obscures the information from the video file data. These systems may even shut off the recording device to prevent further capture of problematic information. However, the existing systems described all capture, store, and process the problematic information. Because the problematic data is stored (albeit sometimes only temporarily) and processed, data spill risks still exist, and therefore these systems cannot meet requirements for certain secure or restrictive environments. The processing required to remove or obscure the information from the video file makes these systems incompatible with applications that require real or near real time video capture and transmission.

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information or real or near real time to facilitate efficient and effective communication. As a special case, data capture and transmission compliance may be implemented in an Augmented Reality environment.

Augmented Reality (AR) refers to the generation of two or three dimensional (3D) video graphics or other media such that they are overlaid on and registered with surrounding objects in the environment. Man-made "markers" aka "sources" having a unique and easily identifiable signature may be placed on the user, on the object or in the scene and used for various purposes. These markers have been used to identify and locate specific objects, to trigger the display of computer generated media or to determine the position and pose of the user.

In certain video or AR environments such as a remote repair or inspection, a concern, primarily of the customer and which is heightened by the video camera industry push to maximize the FOV, is that the user of the video being captured and transmitted or viewed locally (either the field technician or expert, but primarily the field technician), may turn away from the object of interest, intentionally or unintentionally, and capture video of another portion of the scene that should not be captured or transmitted. Some level of data capture and transmission compliance may be required by customer demands, industry regulations, national security or country specific laws to avoid unintentional or intentional broad FOV transmission. Current techniques include physically draping with a cloth or tarp the areas around the object of interest to prevent capture in the video signal, mechanically narrowing the FOV, or sequestering the video prior to transmission and having a security-cleared domain expert review and edit the video signal post-capture. These are time consuming activities. Even more common, and more costly is the removal of the equipment in question to a specialized secure space, such as an empty garage or hanger so that there are no extraneous items in the scene. In many cases removing equipment, physical draping or post-capture editing are either not sufficient to satisfy the compliance requirements or are impractical and costly to implement in a quasi real-time interactive situation. In some situations there are country laws that would prevent any type of post-capture editing for national security and ITAR—International Traffic and Arms Regulations reasons.

U.S. Pat. Nos. 10,403,046 and 10,679,425 entitled "Field of View (FOV) and Key Code Limited Augmented Reality to Enforce Data Capture and Transmission Compliance" disclosed enforcement of an alignment condition between the video camera's pointing direction and a marker in the scene to avoid capture of excluded data in a real-time interactive situation. This may be done, for example, by determining whether the video camera pointing direction satisfies an alignment condition to a marker in the local scene such that the video camera FOV lies within a user-defined allowable FOV about the marker. A separate sensor may be used to detect the presence of the marker within a sensor FOV to satisfy the alignment condition. The camera or sensor FOV may be reduced to create a buffer zone to provide additional assurance that the camera FOV does not stray outside the allowable FOV. If the alignment condition is not satisfied, the video camera is controlled to exclude at least a portion of the camera FOV that lies outside a user-defined allowable FOV from capture within the video signal. For example, this could be done by turning the video camera off or by narrowing its FOV. Markers may also be used as a fail safe to ensure imagery in a particularly sensitive area of the scene is neither captured nor transmitted. If the separate sensor detects these markers, the video camera is shut down. The system may cue the user e.g., "green" means the alignment condition is satisfied, "yellow" means the technician's eyes are beginning to wander and "red" means the alignment condition is violated and the camera is disabled. In this system, the use of a separate sensor to enforce the alignment condition and to detect other markers in sensitive areas is specifically designed for more rigorous environments, in which compliance requires that portions of the scene or tagged objects cannot be captured (detected) by the video camera itself, much less output into the video signal and for environments in which real or quasi real-time interaction is required.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a method for time-delayed storage and processing of images from a single video camera to provide for enforcement of data transmission compliance of real and near real time video.

To provide for enforcement of data transmission compliance of real or near real time video, the present disclosure creates a short time-delay between capture and transmission of a captured video signal to recognize disallowed objects and control the video camera to prevent transmission of any frame including the disallowed object in the video signal. The time-delay may, for example, be implemented with a delay line (circuit) positioned after the camera's memory chip or integrated in the memory chip to buffer the sequence of frames as they are captured.

In an embodiment, to maintain real time performance the time-delay is preferably less than 42 milliseconds (ms), which is equivalent to a single frame for a low-speed video camera at 24 frames/second. This equates to 3 frames for standard video camera at 60 frame/second video and 6 frames for a high-speed video camera at 120 frame/second. Depending upon the application, a greater number of frames may be acceptable for quasi real-time performance.

In an embodiment, a video camera is used to capture imagery within a field-of-view (FOV) in a pointing direction in a local scene to generate a sequence of frames to form the video signal. The sequence of frames are "buffered" for the specified time-delay and transmitted after the expiration of the time-delay. Concurrently, the buffered sequence of frames is processed to recognize disallowed objects. In response to recognition of a disallowed object and prior to expiration of the time-delay, the buffered sequence of frames (or video camera) is controlled to prevent transmission of any frame including the disallowed object in the video signal.

In an embodiment, each of the buffered frames are compared to a Ground Truth Map (GTM) to determine whether the frame includes the disallowed object. In one configuration, the GTM is a map of the local scene that includes one or more objects positioned in the local scene that are identified as disallowed objects. The current camera FOV is compared against the map to determine whether the FOV, hence frame includes the disallowed object. In another configuration, the GTM includes a library of disallowed objects including identifiers of each disallowed object. The library is preferably specifically tailored to the local scene. Each frame is processed with an object recognition algorithm to identify candidate objects that are then compared against the library to determine whether the frame includes the disallowed objects. The two "map" and "library" configurations of the GTM can be combined in parallel or in series to enhance object recognition.

In an embodiment, the video camera is configured with a default condition whether to transmit or block the transmission of buffered frames and issues an interrupt to override the default condition based on whether a disallowed object is or is not found in the frame. In one configuration, the default conditions allows for transmission of the buffered sequence of frames at the expiration of the time-delay. The interrupt overrides the default condition to prevent transmission of any frame including the disallowed object. In another configuration, the default condition disallows transmission of the buffered sequence of frames at the expiration of the time-delay. If received prior to expiration of the time-delay, the interrupt overrides the default condition and allows transmission on a frame-by-frame basis when the disallowed object is not detected in that frame.

In different embodiments, upon detection of a disallowed object, either "hard" or "soft" interrupts can be issued to control the video camera to prevent transmission of frames including the video camera. A hard interrupt turns the video camera off. Soft interrupts may blank frames the include the disallowed object, flush the entire buffer or obscure the disallowed object in the frames in which it occurs.

In embodiments in which a "son" interrupt is employed, concurrent with issuing the interrupt a cue can be generated to change the pointing direction of the video camera to remove the disallowed object from the camera's FOV to reduce the number of frames in which the disallowed object is captured. In some cases, if the cue fails to remove the disallowed object from the camera's FOV, the system may issue a "hard" interrupt to turn the video camera off.

In different embodiments, the video camera is trained on an allowed object and away from disallowed objects. The camera and object recognition processor recognize and locate allowed objects. The system determines whether the camera's pointing direction satisfies an alignment condition to one of the allowed objects. If not, the system generates a cue to change the video camera pointing direction to enforce the alignment condition. If the cue fails to enforce the alignment condition, the video camera is deactivated. The GTM can be used to verify recognized allowed objects.

In an embodiment, the rate of motion (e.g., velocity and acceleration) of an object in the scene may be defined as disallowed if the rate of motion exceeds a maximum value. More specifically, if a new object enters a scene at an excessive rate of motion it is marked as disallowed. In addition, the rate of motion of the video camera itself may be defined as a disallowed object if the rate of motion exceeds a maximum value.

In different embodiments, the video camera pointing direction is slaved or controlled by user motion (e.g., a head mounted video camera), a user-controlled manual manipulator (e.g., a robotic arm) or a fully automated manual manipulator (e.g., an AI controlled robotic arm or semi-autonomous or autonomous robot).

These and other features and advantages of the disclosure will be apparent to those skilled in the art from the following detailed description of preferred embodiments, taken together with the accompanying drawings, in which:

BRIEF DESCRIPTION OF THE DRAWINGS

FIG. 4 is a timing diagram illustrating the time-delay of the captured video signal with respective to the processing of the video signal and an interrupt to prevent transmission of a disallowed object captured in the video signal;

DETAILED DESCRIPTION

Figure 1:
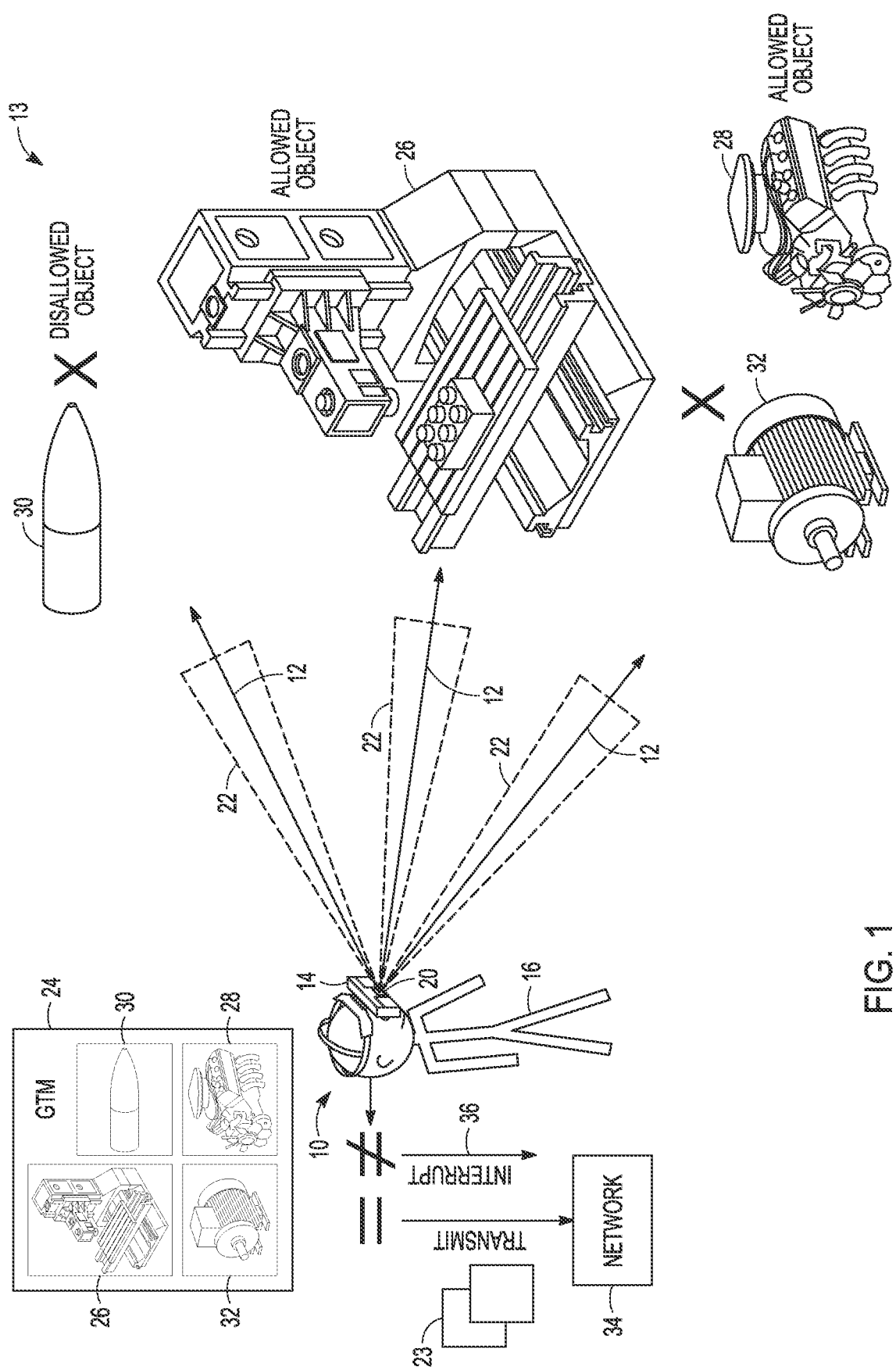
FIG. 1 is an illustration of a system in which time-delayed storage of video camera frames that form the video signal provides for enforcement of data transmission compliance of real and near real time video.
Figure 2:
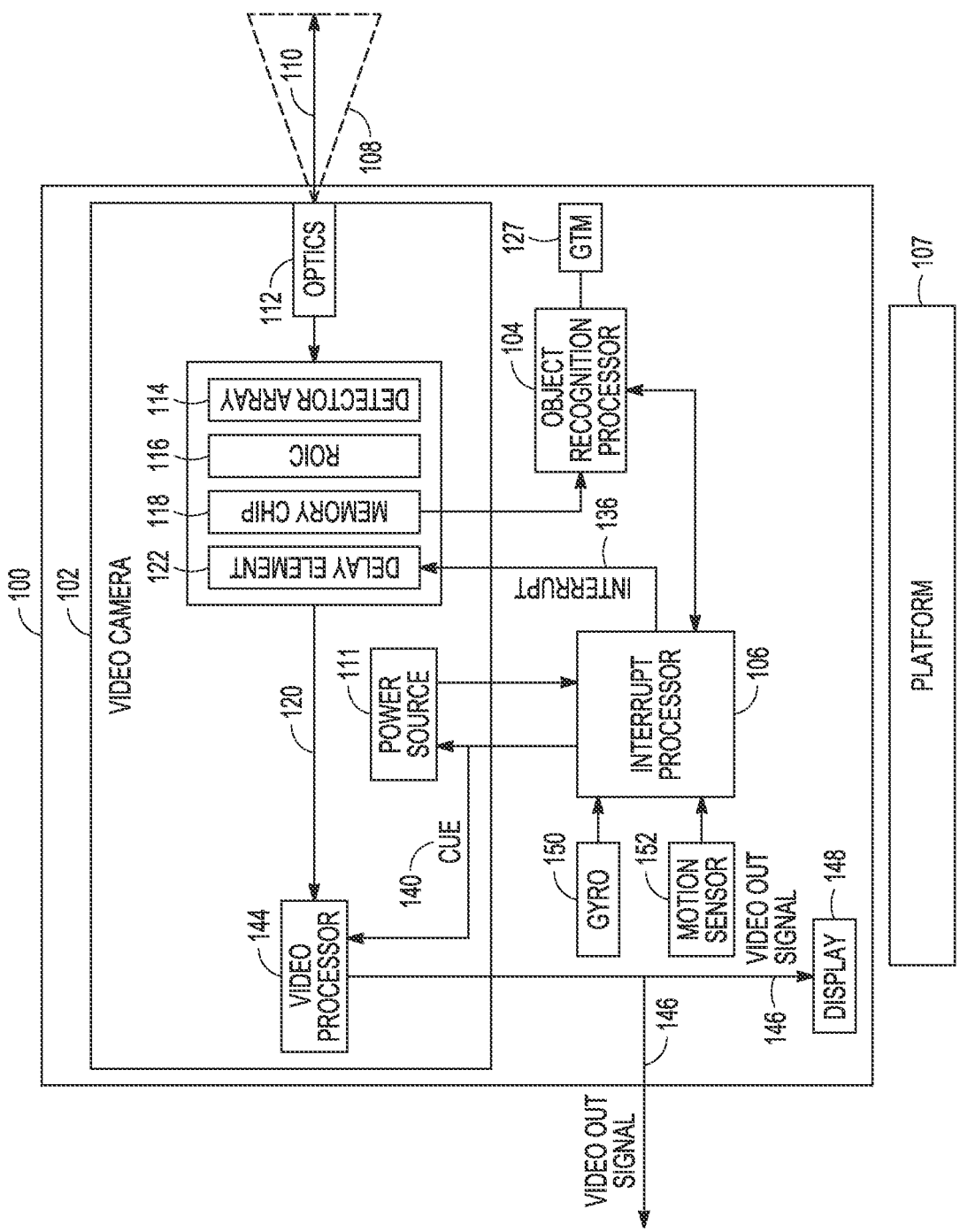
FIG. 2 is a block diagram of an embodiment of a video capture, display and transmission device to enforce data transmission compliance of real and near real time video.
Figure 3A:
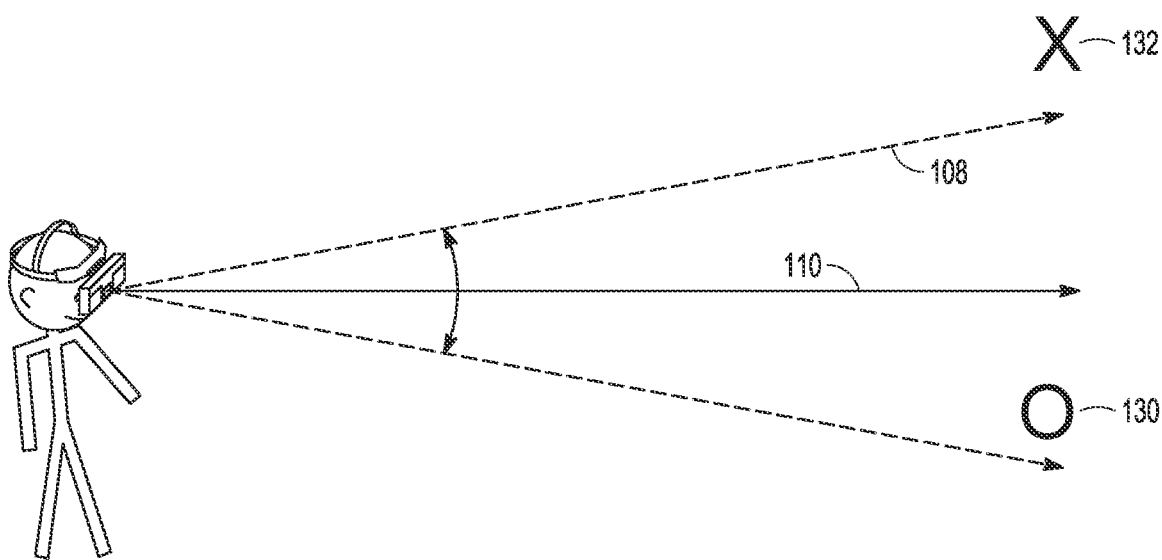
FIGS. 3A and 3B are illustrations of an embodiment in which the video camera relies only on the time-delayed storage of camera images with respect to the processing of the frames to enforce data transmission compliance.
Figure 3B:
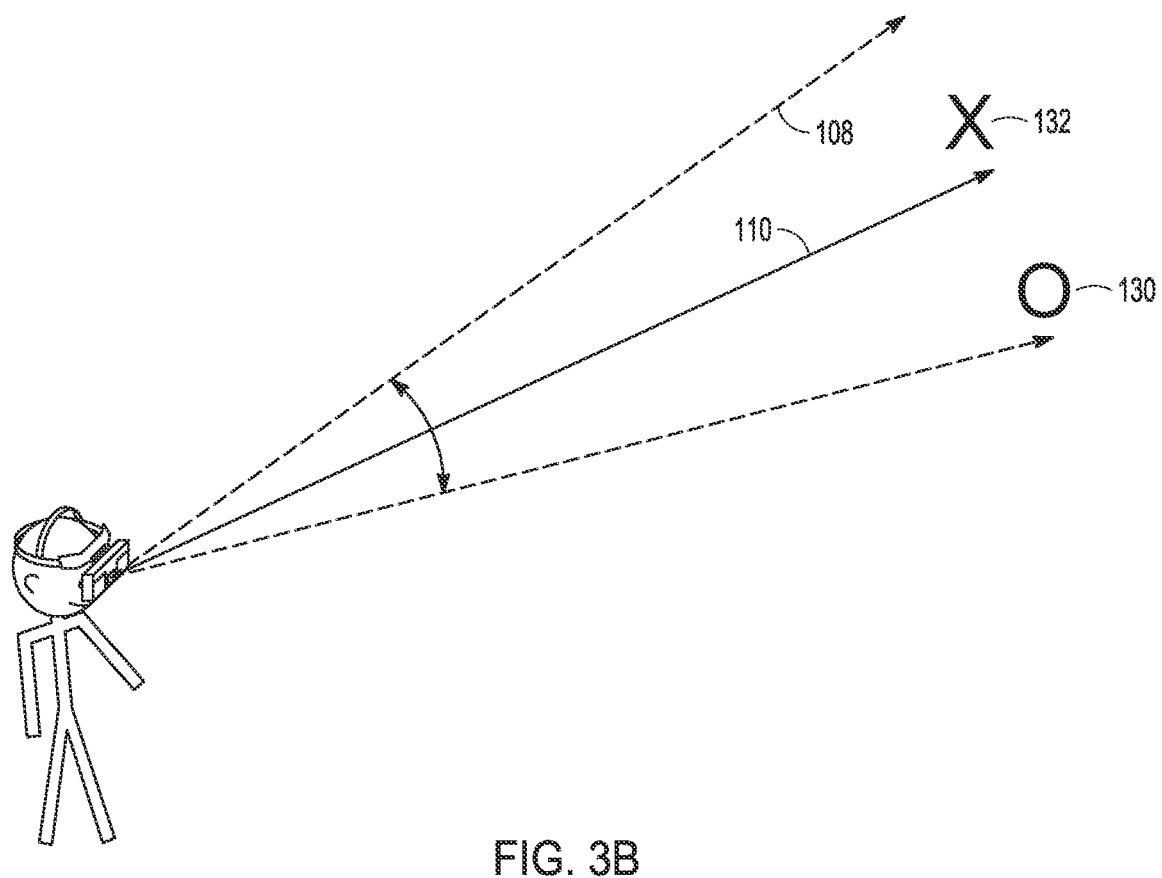

Video capture that enforces data transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information or real or near real time to facilitate efficient and effective communication. As a special case, data capture and transmission compliance may be implemented in an Augmented Reality environment. The video camera pointing direction is slaved or controlled by user motion (e.g., a head mounted video camera or hand-held video camera), a user-controlled manual manipulator (e.g., a robotic arm) or a fully automated manual manipulator (e.g., an AI controlled robotic arm or semi-autonomous or autonomous robot).

The present disclosure is directed to these and other similar applications in which some level of data capture and transmission compliance may be required by customer demands, industry regulations, national security or country specific laws. In certain instances, compliance may require that portions of a scene or specifically tagged objects cannot be included within the video signal output by the video camera for display or transmission. The required level of compliance may be determined by a number of different factors and may change between or even during capture and display or transmission of the video signal.

To prevent the transmission of excluded data, a short time-delay between the capture and transmission of a video signal is exploited to allow for processing of the buffered frames to recognize disallowed objects and control the video camera to prevent frames that include disallowed objects from being transmitted. The time-delay can be implemented in real or near real time or slower if the application does not demand such performance with, for example, a discrete delay line or integrated into a memory chip positioned after the video camera's ROIC. For example, the slowest acceptable video frame rate for most users is approximately 24 frames/sec (fps), or approximately 42 milliseconds (ms). A time-delay of less than 42 ms would be a generally acceptable to most users. A fast video camera is 120 fps or about 8 ms. 42 ms is equivalent to a single frame for a low-speed video camera at 24 frames/second, 3 frames for standard video camera at 60 frame/second video 6 frames for a high-speed video camera at 120 frame/second. Depending upon the application, a greater number of frames may be acceptable for quasi real-time performance. The time-delay can be utilized to enforce data transmission compliance for a single image or a sequence of images in the video signal.

Referring now to FIG. 1, in an embodiment a video capture, display and transmission device 10 such as a pair of video goggles 14 or a hand-held unit (e.g., a tablet or cell phone) has a pointing direction 12 that is slaved to technician motion (e.g., where a field technician 16 is looking or pointing the unit). Device 10 includes a video camera 20 (e.g. a 2D or 3D CMOS, CCD or SWIR camera) configured to capture light within a camera FOV 22 about pointing direction 12 in a local scene 13 as a sequence of frames to form a video signal 23.

In this example, field technician 16 may be moving around inside a manufacturing facility to confirm the existence and location of certain objects, repair or maintain certain objects or to use certain objects. These objects may be considered to be "allowed" objects. The technician may even be prompted or cued to maintain the pointing direction 12 on a specified object to perform a certain task (e.g., verification, repair, use). The field technician 16 can capture, display and transmit "allowed" objects. The field technician 16 cannot capture and transmit "disallowed" objects. The technician may be prompted to turn the pointing direction 12 away from any disallowed objects.

What constitutes allowed or disallowed objects may depend on the application, the type of objects in the local scene, the permissions of the field technician, supervisor and any remote staff, and any specific restrictions placed on excluded data and transmission compliance. This information may be stored in the device. The device processes the sequence of captured frames to detect and locate objects and determine whether they are allowed or disallowed objects. The efficiency and accuracy of the object recognition process can be improved by augmenting it with a Ground Truth Map (GTM) 24 in which specific objects 26 and 28 were indicated as allowed and specific objects 30 and 32 were indicated as disallowed. The GTM may be generated using the video camera 20, a different imaging system or provided from an external source. The GTM may constitute a map of the local scene in which the allowed or disallowed objects include position information or may constitute a library of objects found in the local scene in which the allowed or disallowed objects include identifiers of the object such as shape, texture or other features or both. The objects may be represented in the GTM as real sensor data, as 2D or 3D computer-generated models, as object icons including values of various identifiers or simply as allowed or disallowed. Background in the local scene and ground truth map may default to either allowed or disallowed. Objects that move into the scene that are not in the GTM are suitably disallowed until identified and marked as allowed. Similarly objects that are unrecognized are suitably disallowed until identified and marked as allowed. Instead of just being based on their content, objects may be defined and disallowed based on other attributes. For example, any object that is identified as having a distance from the video camera that is either too close (<min distance) or too far (>max distance) may be designated as disallowed. The rate of motion (e.g., velocity and acceleration) of the video camera may be defined as an object and disallowed if the rate of motion exceeds a maximum value. The device compares recognized objects to the ground truth map to verify whether it's the same object, allowed or disallowed and the location, which greatly improves the accuracy and confidence of the object recognition.

To prevent the transmission of excluded data, a short time-delay between capture of the video signal 23 by the video camera 20 and the transmission of the video signal 23 is exploited to recognize disallowed objects and control the video camera to interrupt and stop frames that include disallowed objects from being transmitted via a network 34. The time-delay can also be used to enforce an alignment condition of the video camera's pointing direction 12 to an allowed object. The time-delay can be implemented in real or near real time or slower if the application does not demand.

For example, if pointing direction 12 satisfies an alignment condition (e.g., pointing direction within a few degrees of a preferred line-of-sight (LOS)) to allowed object 26 to perform some task and the video camera does not recognize and locate any disallowed objects 30 or 32, the time-delayed images captured by the video camera are formed into the video signal that may be displayed to the field technician or transmitted to a remote location via network 34 (e.g., storage or display to other remote users). If either condition is violated, the video camera is controlled to interrupt and stop images from being transmitted via network 34; instead an interrupt 36 is issued to prevent any frame including the disallowed object from being transmitted. The video camera may be controlled by issuing a "hard" interrupt that interrupts its power (i.e., turning the camera off) or by issuing a "soft" interrupt that may blank frames that include disallow objects, flush the buffer including such frames or edit the frames to delete or obscure the disallowed objects before they are transmitted. Prior to or along with controlling the video camera, a cue (e.g., audio, video or mechanical vibration) may be directed to prompt the field technician to look at the allowed object or away from the disallowed object. If the cue is successful, the number of frames that the video camera has to blank or edit may be minimized. The object recognition and decision process can be implemented such that the time-delay is very short and although delayed the video signal is effectively real or near real time.

The same method can be applied to a remotely user-controlled robotic arm that points the video camera or a fully autonomous robot that uses a video camera as part of its vision system. In the case of the robotic arm, "time-delay" can ensure that protected data is not transmitted to a remote site, where the user is located or elsewhere. In the case of a fully autonomous robot, "time-delay" can ensure that protected data is not transmitted elsewhere.

The method can be applied to applications and local scenes in which only allowed objects are present or only disallowed objects are present.

Referring now to FIGS. 2, 3A-3B and 4, in an embodiment a video capture and display device 100 includes a video camera 102, an object recognition process 104, a GTM 127 and an interrupt processor 106 to control the video camera to prevent disallowed objects from being captured in the video signal and to enforce an alignment condition to allowed objects. Device 100 is coupled to a "platform" 107 such as a user, robotic arm, robot etc. that controls the pointing direction of the device.

Video camera 102 captures light within a camera field-of-view (CFOV) 108 in a pointing direction 110 in the local scene. The video camera includes a power source 111, optics 112 to collect light within the CFOV, a detector array 114 to sense and integrate light to form an image converting photons to electrons, a read out integrated circuit (ROIC) 116, which includes an amplifier and an A/D converter, to read out a sequence of image frames at a frame rate, a memory chip 118 to store the sequence of images to form a video signal 120, and a delay element 122 to delay the transfer of frames to video processor 144 by a specified time-delay. Delay element 122 may be a discrete delay line (circuit) that simply delays transfer of the frames or may be integrated into memory chip 118. In either case, the delay element buffers the sequence of image frames by the specified time-delay.

As previously mentioned, object recognition processor 104 may verify detected allowed or disallowed objects against a ground truth map 127 within the specified time-delay. In one configuration, a gyroscope 150 or motion sensor 152 can be used to provide the position and pointing direction 110 of video camera 102. Object recognition processor 104 uses this information to compute the current FOV 108 and compare it to the GTM 127 (includes position information of disallowed objects) to determine whether a disallowed object lies within the current FOV 108. In another configuration, object recognition processor 104 processes the current FOV in each captured frame with an object recognition algorithm to identify candidate objects and compares them against a library of disallowed objects in the GTM 127 to determine whether a recognized object is disallowed or not. In yet another configuration, the GTMs that identify disallowed objects by position or by identifying features may be combined and run in series or in parallel to increase the robustness of a system.

If, prior to the expiration of the time-delay imposed by delay element 122, a disallowed object 132 is recognized in one or more frames 134 from the video camera, the interrupt processor 106 issues an interrupt 136 to video camera 102 to prevent transmission of frames 134 including the disallowed object 132 and its inclusion in subsequent frames 138 in the video signal. This prevents disallowed objects from entering the video signal and being displayed or transmitted. Interrupt 136 can cut-off power shutting off the video camera, blank frames including disallowed object 132, flush the buffer of all frames if any frame includes disallowed object, or serve to edit the images to remove or obscure pixels corresponding to the disallowed object. Interrupt 136 may also be used to control the platform 107 to change the pointing direction of the video camera. Interrupt processor 106 may also issue a cue 140 to prompt the "platform" 107 to change the pointing direction away from the disallowed object. If the platform is a user, the cue may be handled by the video processor to relay a visual or audio cue to the user. If successful, interrupt 136 may be removed and the video camera allowed to return to function normally with minimal disruption. If unsuccessful, the interrupt 136 may shutdown the video camera until the issue is resolved.

As shown in FIG. 4, the time-delay 142 can be one or more video frames (N). As long as the interrupt is issued less than N video frames after the disallowed object is occurs at frame 134, the time-delayed frames that contain the disallowed object will be interrupted and not transferred to the video processor. The default condition may be to allow frames at the expiration of the specified time-delay to be transmitted unless an interrupt is received overriding the default condition and blocking transmission. Alternately, the default condition may be to block frames at the expiration of the specified time-delay unless an interrupt is received overriding the default condition.

Video processor 144 processes video signal 120 to form video out signals 146 for a display 148 or transmission via a transmitter. If no disallowed objects are detected the video out signals 146 will be normal video signals. If an interrupt was issued, the video out signals 146 may receive no video signal if power was interrupted, may receive a video signal including a certain number of blank or noisy frames or may receive a video signal in which the pixels corresponding to the disallowed objected are removed or obscured. In the later case, it is critical to note that the images are edited in real-time.

Interrupt processor 106 may determine whether the camera's pointing direction 110 satisfies an alignment condition to the allowed object 130. For example, is the pointing direction 110 within +/−2 degrees of an intended line-of-sight to the allowed object? This determination can be achieved by comparing the current camera FOV 128 against the ground truth map 127 if the map includes position information of the objects, for example. Alternately, gyroscope 150 or motion sensor 152 can be used to track the video camera's 6 degree-of-freedom (6DOF) pose e.g. position in x, y, z and orientation in yaw, pitch, roll (rotations about x, y, z axes). The current pose can be compared to a calculated pose to the allowed object to determine whether alignment condition is satisfied. If the pointing direction fails to satisfy the alignment condition, interrupt processor 106 may generate a cue to change the video camera pointing direction to enforce the alignment condition. If the cue fails to enforce the alignment condition, the interrupt processor 106 issues an interrupt 136 to deactivate the video camera. Loss of the alignment condition does not necessarily mean that the camera is going to capture a disallowed object. However, if the video camera wanders off of the allowed object and the cue fails to correct the problem, turning off the video camera, at least temporarily, is effective to train the platform to maintain the proper alignment to the allowed object to perform the task at hand. The length of time the video camera is turned off can vary in order to more effectively train the local or remote user or robot.

Figure 5A:
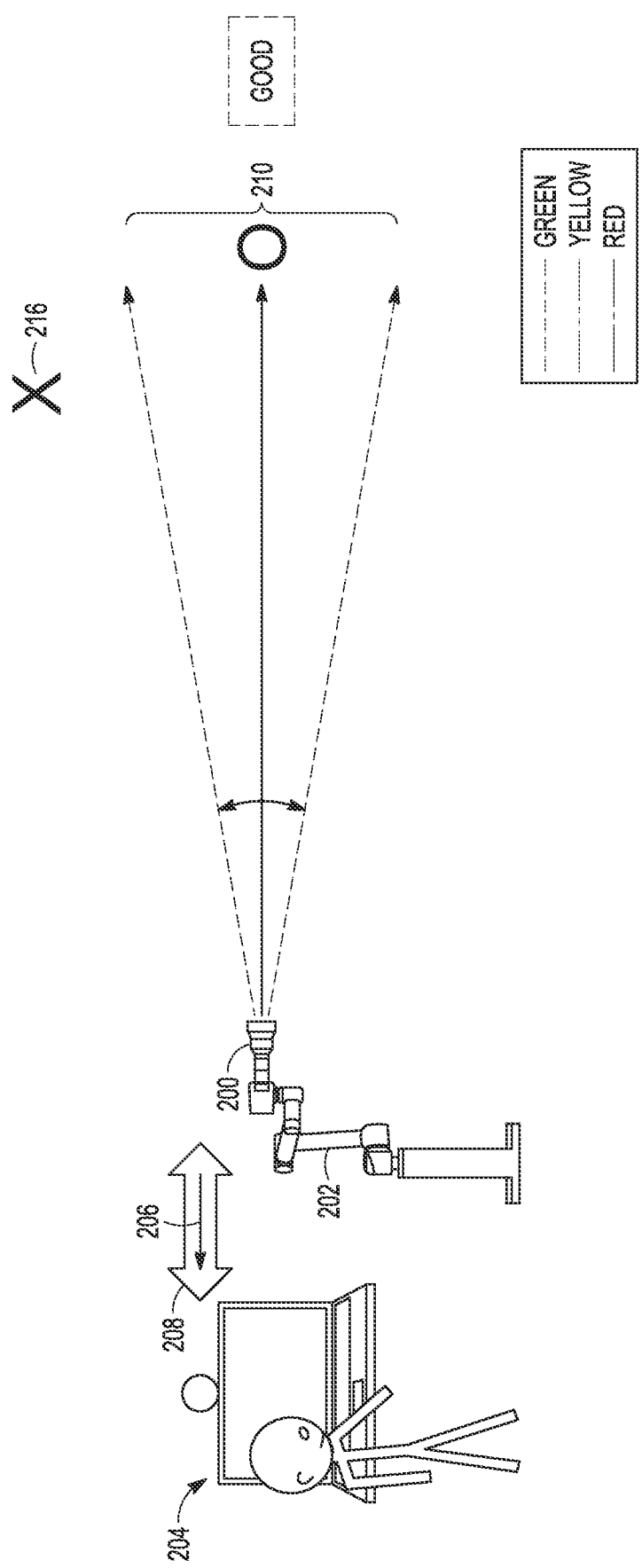
FIGS. 5A and 5B are illustrations of an embodiment in which a cue is generated to minimize the number of captured frames that include a disallowed object to enforce data transmission compliance.
Figure 5B:
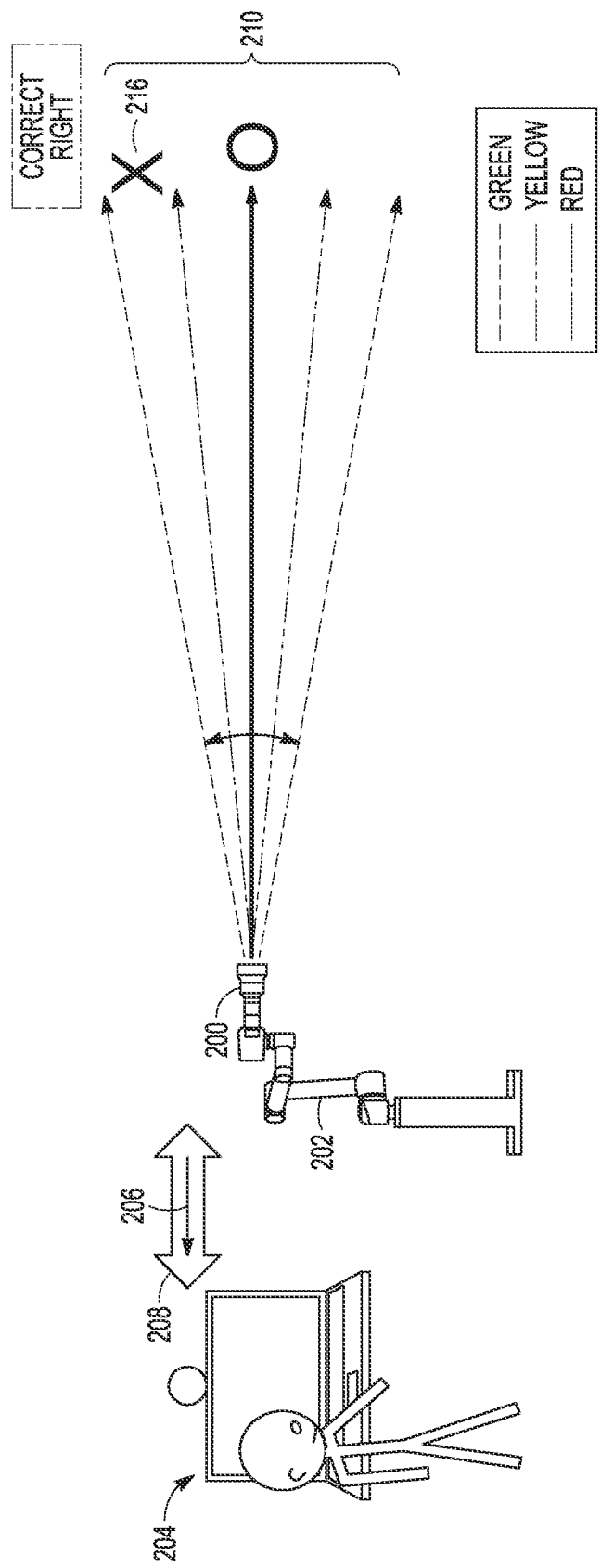

Referring now to FIGS. 5A and 5B, in an embodiment a video capture and transmission device 200 is mounted on a robotic arm 202 that is controlled by a remote user 204. A video signal 206 captured by device 200 is transmitted via a communication link 208 to remote user 204 who sends instructions to robotic arm 202 via communication link 208 to control the location and orientation or "pose" of device 200. Device 200 includes a video camera that captures light within a camera FOV 210 in a pointing direction dictated by the orientation of the device. If a disallowed object 216 is recognized, the interrupt processor generates a cue to change the video camera pointing direction to minimize the number of frames in which the disallowed object appears. If the cue is successful no further control of the video camera is required as the disruption due to the disallowed object has been minimized. If the cue fails and the disallowed object remains in the camera FOV 210, a hard interrupt may be issued to turn the video camera off.

In an AR environment the pointing direction of the video camera is slaved to field technician motion (e.g., techni-cian's head in the case of goggles or hands in the case of a hand-held unit). A video signal is captured within a FOV of an object in a local scene at arm's length from the technician. The technician receives hand gestures for manipulation of the object from an expert at a remote location, which are registered and overlaid on the video signal to create an augmented reality to instruction the user in manipulation of the object. In different implementations, the hand gestures are provided when an expert views and responds to the video signal captured and transmitted to the remote field location by the technician's video camera in real-time, when an expert interacts with a replica of the object in real-time or when an expert generates "canned" instructions offline by either responding to a video or interacting with a replica of the object.

The concern is that the technician may turn away from the object of interest, intentionally or unintentionally, and capture video of another portion of the scene or object that should not be captured or transmitted. The present disclosure provides a system and method for automatically and under technician/customer/master ("user") control controlling the video camera in such a constrained AR environment to exclude portions of a scene for data display and transmission compliance without interfering with the AR overlays that instruct the technician in manipulation of the object.

Figure 6:
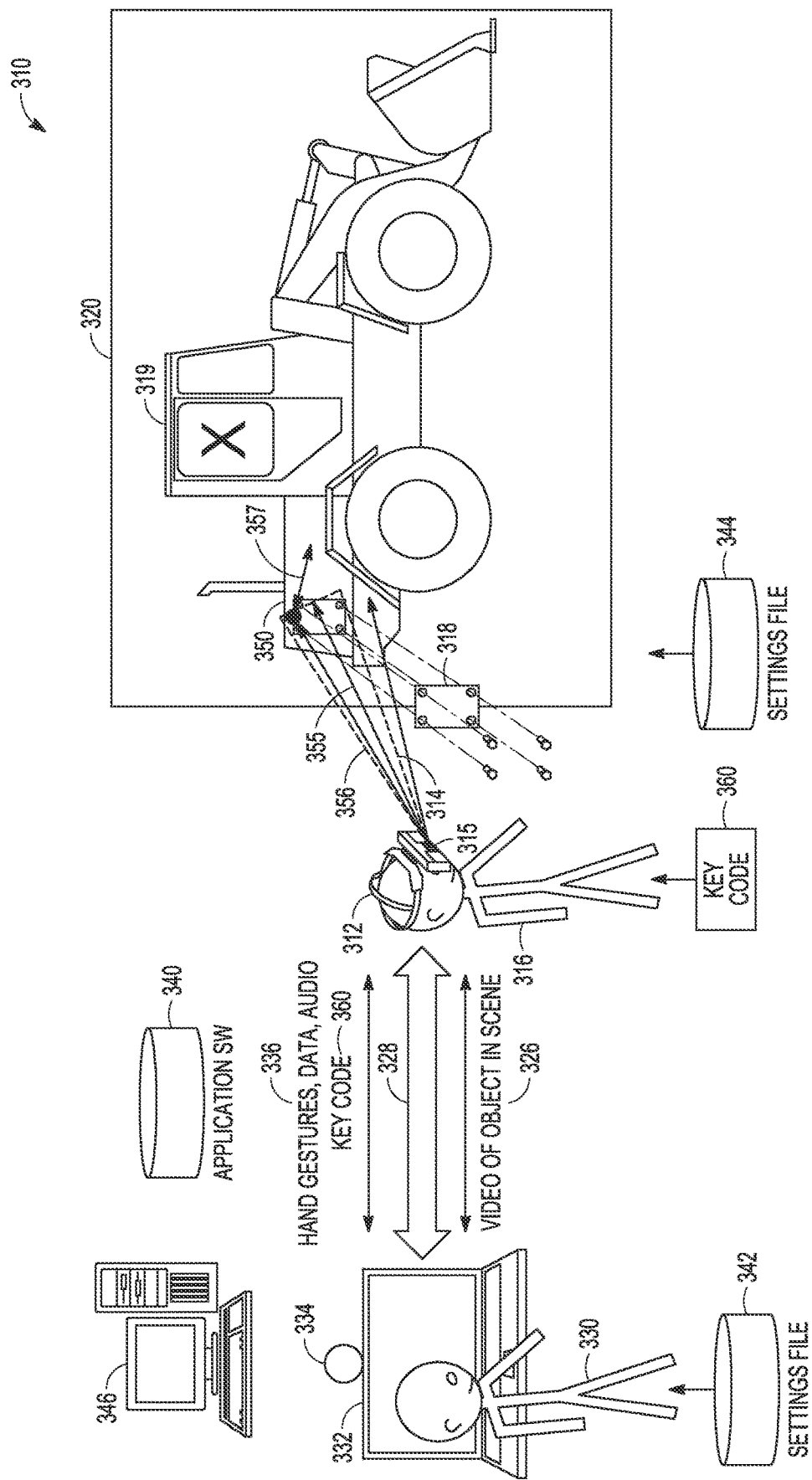
FIGS. 6 and 7 are illustrations of an embodiment of an Augmented Reality (AR) system in which time-delayed storage of the camera images that form the video signal is used to enforce an alignment condition to an allowed objected and to prevent transmission of disallowed objects.
Figure 7:
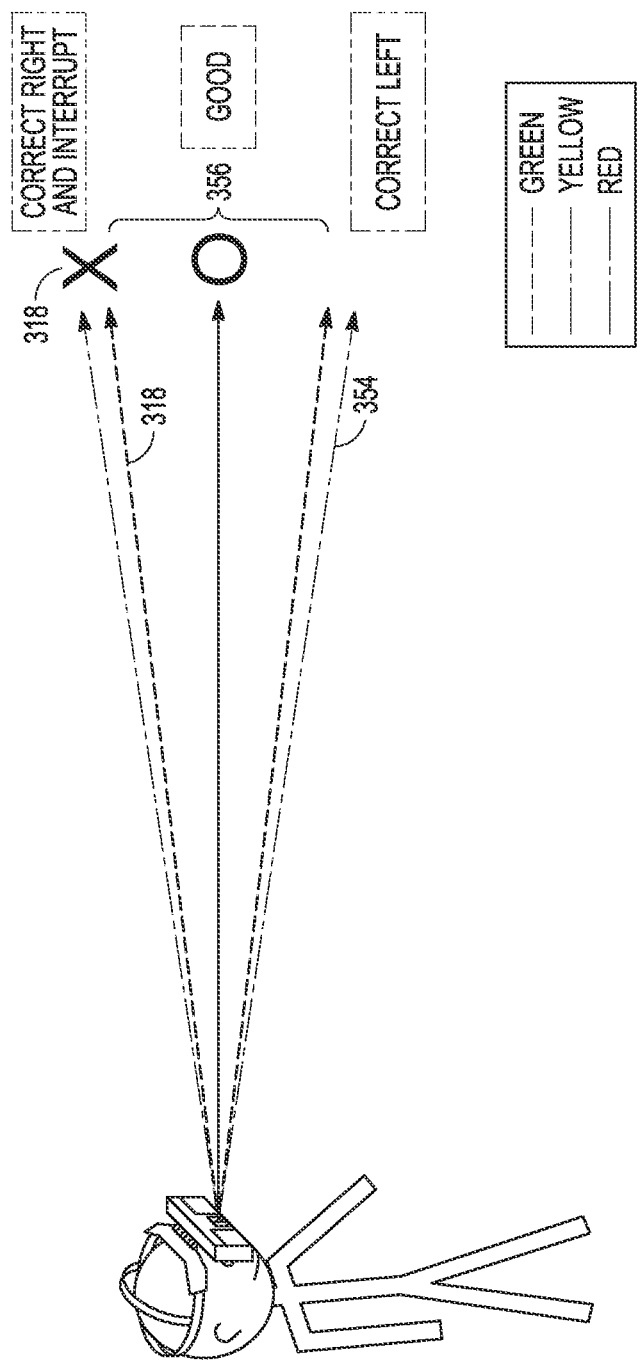

With reference to FIGS. 6 and 7, an embodiment of an AR system 310 includes a video capture, display and transmission device 312 such as a pair of video goggles or a hand-held unit (e.g., a tablet or cell phone) whose pointing direction 314 is slaved to technician motion (e.g., where a field technician 316 is looking or pointing the unit). Field technician 316 manipulates an object 318 in a local scene 320 to, for example, perform maintenance on the object or receive instructions on how to operate the object. In this example, object 318 is an access panel and the local scene includes a tractor. The access panel is an "allowed" object. For purposes of illustration, the cabin 319 is a "disallowed" object.

Device 312 includes a video camera 315 that captures imagery of object 318 in local field scene 320 with a short time-delay between capture and display or transmission and transmits a video signal 326 over a communications link 328 or network to a remote site, possibly in a different country. Video signal 326 is presented to an expert 330 on a computer workstation 332, which is provided with a device 334 to capture the expert's hand gestures. Expert 330 manipulates the object in the video with his/her hands (or via a tool) to perform the task. Device 334 captures the hand gestures, which are converted to animated hand gestures 336 and transmitted back over communications link 328 to user 316 where they are registered to and overlaid on the display. Expert 330 may provide instructions in the form of audio, text or other media in addition to or instead of the hand gestures to support the AR environment. The AR environment itself is implemented with application software 340 and settings files 342 and 344 on the remote and local computer systems 332 and 312 and a server 346.

In accordance with the disclosure, the AR system or method determines whether the pointing direction 314 of the local video capture and display device 312 satisfies an alignment condition 350 to allowed object 318. Alignment condition 350 relates the camera pointing direction 314 to a line-of-sight (LOS) 355 to the allowed object. The two must remain with a specified misalignment 357 given as an angle or distance to the allowed object. The misalignment 357 may be fixed e.g., plus or minus 5 degrees, set by the user.

One or more technician/customer, master or expert key codes 360 are used to identify the technician/master/expert, define pairing of the allowed object and specify tolerances that define the alignment condition 350. A key code allows the field technician/customer/master or an expert to control the video camera to protect the field technician from transmitting data in the scene that would violate customer or country policies or legal requirements. The key code may allow the holder of the code to specify via, for example thru a GUI, allowed or disallowed objects or may pre-load those selections for a given local scene or task. To establish the alignment condition, a user might specify a 24" distance, which creates a circle with a 24" radius about the LOS to the allowed object. Alternately, the user might specify a plus/minus 5 degrees of misalignment for the pointing direction, which for the nominal arm's length working distance might create, for example, a circle with a 12" radius. Instead of or in addition to specifying a distance or angle, the user might specify and place additional markers (disallowed objects) in the scene about the allowed object that define the outer boundary or tolerance of the alignment condition. Activation of the video capture and display device 312 would require successful pairing with at least the identified allowed object. Another expert controlled key code may be provided at the remote location to the field technician to ensure that no non-complying data is transmitted and received at the remote location. This key code is enforced at the field technician's AR system. In addition to distances, the key code may also prepopulate a known set of allowed or disallowed shapes.

Video camera 315 captures light within the camera FOV 356 while delaying the captured frames by a time-delay. Concurrent with the delay, the buffered frames are processed to recognize and locate allowed 318 or disallowed 319 objects within the camera FOV 356. An interrupt processor determines, using the video signal or gyroscope measurements for example, whether the pointing direction 314 satisfies the alignment condition 350 to allowed object 318 and whether the video camera's FOV 356 does or shortly will include the disallowed object 319.

As regards satisfaction of the alignment condition to the allowed object 318, as long as the technician looks in the direction of the allowed object 318 the allowed object is captured in the camera FOV 356 and the alignment condition is satisfied (green "Good") thereby enabling the camera to capture imagery in the camera FOV 356. As the technician's eyes (camera) begin to wander, the allowed object gets close to the edge of alignment condition 350 (yellow "Correct Left" or "Correct Right") thereby causing a cue (audio, video, vibration) to be issued as a reminder to the technician to maintain his or her focus on the allowed object 318 and the task at hand. The camera remains enabled and video is captured for transmission and display. If the technician's LOS wanders too far, the camera FOV loses pairing with allowed object 318 thereby violating the alignment condition 350 and causing the video camera to be disabled and a cue (red, "Deactivate Camera") to be issued. The length of time the video camera is disabled can be controlled to "train" the technician to maintain his or her focus on the allowed object.

As regards minimizing the capture duration of disallowed object 319 in the video signal, if disallowed object 319 is captured in the camera FOV 354 an interrupt is issued to control the video camera such that any camera frames containing disallowed object 319 are not transmitted. A cue e.g., red "Deactivate Camera" or similar can be issued to the technician to notify the technician of the violation as to the disallowed object and to prompt the technician to change his or her LOS.

In another embodiment, an additional sensor (2 or 3D camera, Lidar or Sonar) captures a sensed signal within a sensor FOV (SFOV) along the pointing direction that spans the entire CFOV. A processor processes the sensed signal to recognize and possibly locate disallowed objects within the SFOV prior to the expiration of the specified time-delay. If a disallowed object is recognized prior to the expiration of the of the specified time-delay, the video camera is controlled to prevent transmission of any frame including the disallowed object.

In general, a video camera is used to capture light within a field-of-view (FOV) in a pointing direction in the local scene to generate a sequence of frames to form the video signal. The formation of the video signal is delayed by a specified time-delay and the sequence of frames after the expiration of the time-delay. The delay may occur in the capture of light that forms the video signal, the output of the ROIC prior to capture of frames in memory, within the memory (e.g., a buffer) or at the output of memory when using an additional sensor. When using the video camera only, the delay may occur within the memory (e.g., a buffer) or at the output of memory. Concurrent with the delay, imagery within the FOV (either captured by the video camera or an additional sensor) is processed to recognize disallowed objects. In response to recognition of the disallowed object and prior to expiration of the specified time-delay, the video camera is controlled to prevent transmission of any frame including the disallowed object in the video signal.

It should be understood that each of the processors e.g., the object recognition processor, interrupt processor video processor may be implemented as a single or multiple processors.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A method of preventing transmission of excluded data in a local scene from a transmitted video signal, said method comprising:
   using a video camera to capture imagery within a field-of-view (FOV) in a pointing direction in the local scene to generate a sequence of frames to form the video signal;
   buffering the sequence of frames for a specified time-delay;
   measuring a rate of motion of an object entering the local scene;
   if the measured rate of motion exceeds a maximum value, issuing an interrupt to prevent transmission of the buffered sequence of frames;
   processing the buffered sequence of frames to recognize disallowed object;
   in response to recognition of at least one of the disallowed objects prior to expiration of the time-delay, controlling the buffered sequence of frames to prevent transmission of any frame including the disallowed object in the video signal; and if there is no recognition of at least one of the disallowed objects prior to expiration of the time-delay, then transmitting the sequence of frames after the expiration of the time-delay.

2. The method of claim 1, wherein the specified time-delay is at most 42 ms.

3. The method of claim 1, wherein the specified time-delay is at most 6 frames for a video frame rate of 120 frames/second, 3 frames for a video frame rate of 60 frames/second or 1 frame for a video frame rate of 24 frames/second.

4. The method of claim 1, wherein the specified time-delay is one frame.

5. The method of claim 1, wherein the step of processing the buffered sequence of frames comprises comparing each frame to a Ground Truth Map (GTM) to determine whether the frame includes at least one of the disallowed objects.

6. A method of preventing transmission of excluded data in a local scene from a transmitted video signal, said method comprising:
using a video camera to capture imagery within a field-of-view (FOV) in a pointing direction in the local scene to generate a sequence of frames to form the video signal;
buffering the sequence of frames for a specified time-delay;
processing the buffered sequence of frames to recognize disallowed objects by comparing each frame to a Ground Truth Map (GTM) that is a map of the local scene that includes one or more objects positioned in the local scene that are identified as disallowed objects by using a position of the video camera in the local scene and its current pointing direction, computing a current camera FOV; and comparing the current camera FOV to the GTM to determine whether the current camera FOV includes at least one of the disallowed objects
to determine whether the frame includes at least one of the disallowed objects;
in response to recognition of at least one of the disallowed objects prior to expiration of the time-delay, controlling the buffered sequence of frames to prevent transmission of any frame including the disallowed object in the video signal; and
if there is no recognition of at least one of the disallowed objects prior to expiration of the time-delay, then transmitting the sequence of frames after the expiration of the time-delay.

7. The method of claim 5, wherein the GTM includes a library of the disallowed objects including identifiers of each of the disallowed objects, wherein the step of processing the buffered sequence of frames comprises:
processing each frame with an object recognition algorithm to identify candidate objects; and
comparing the candidate objects against the library of the disallowed objects to determine whether the frame includes at least one of the disallowed objects.

8. A method of preventing transmission of excluded data in a local scene from a transmitted video signal, said method comprising:
using a video camera to capture imagery within a field-of-view (FOV) in a pointing direction in the local scene to generate a sequence of frames to form the video signal;
buffering the sequence of frames for a specified time-delay;
processing the buffered sequence of frames to recognize disallowed object by comparing each frame to a Ground Truth Map (GTM) that includes a library of disallowed objects including identifiers of each of the disallowed objects by processing each frame with an object recognition algorithm to identify candidate objects; and comparing the candidate objects against the library of the disallowed objects to determine whether the frame includes at least one of the disallowed objects;
in response to recognition of at least one of the disallowed objects prior to expiration of the time-delay, controlling the buffered sequence of frames to prevent transmission of any frame including the disallowed object in the video signal; and
if there is no recognition of at least one of the disallowed objects prior to expiration of the time-delay, then transmitting the sequence of frames after the expiration of the time-delay
wherein the library of the disallowed objects is specifically tailored to the local scene to include the disallowed objects present in the local scene.

9. The method of claim 1, wherein the steps of buffering the sequence of frames, processing the buffered sequence of frames and issuing an interrupt are computer-implemented.

10. The method of claim 1, further comprising:
generating a cue to change the video camera pointing direction to remove the at least one of the disallowed objects from the camera FOV and reduce the number of frames containing the at least one of the disallowed objects.

11. A method of preventing transmission of excluded data in a local scene from a transmitted video signal, said method comprising:
using a video camera to capture imagery within a field-of-view (FOV) in a pointing direction in the local scene to generate a sequence of frames to form the video signal;
buffering the sequence of frames for a specified time-delay;
processing the buffered sequence of frames to recognize disallowed object;
in response to recognition of at least one of the disallowed objects prior to expiration of the time-delay, controlling the buffered sequence of frames to prevent transmission of any frame including the disallowed object in the video signal;
if there is no recognition of at least one of the disallowed objects prior to expiration of the time-delay, then transmitting the sequence of frames after the expiration of the time-delay
processing the buffered sequence of frames to recognize an allowed object;
determining whether the camera's pointing direction satisfies an alignment condition to the allowed object;
if the pointing direction fails to satisfy the alignment condition, generating a cue to change the video camera pointing direction to enforce the alignment condition; and
if the cue fails to enforce the alignment condition, issuing an interrupt to prevent transmission of the buffered sequence of frames.

12. The method of claim 1, wherein a default condition is to allow transmission of the buffered sequence of frames in the video signal at the expiration of the time-delay, wherein controlling the buffered sequence includes issuing an interrupt to override the default condition and prevent transmission of any frame including the at least one of the disallowed objects in the video signal.

13. A method of preventing transmission of excluded data in a local scene from a transmitted video signal, said method comprising:
    using a video camera to capture imagery within a field-of-view (FOV) in a pointing direction in the local scene to generate a sequence of frames to form the video signal;
    buffering the sequence of frames for a specified time-delay;
    processing the buffered sequence of frames to recognize disallowed object;
    in response to recognition of at least one of the disallowed objects prior to expiration of the time-delay, controlling the buffered sequence of frames to prevent transmission of any frame including the disallowed object in the video signal; and
    if there is no recognition of at least one of the disallowed objects prior to expiration of the time-delay, then transmitting the sequence of frames after the expiration of the time-delay
    wherein a default condition is to disallow transmission of the buffered sequence of frames in the video signal at the expiration of the time-delay, wherein controlling the buffered sequence includes issuing an interrupt to override the default condition to allow transmission on a frame-by-frame basis when the at least one of the disallowed objects is not detected in that frame.

14. A method of preventing transmission of excluded data in a local scene from a transmitted video signal, said method comprising:
    using a video camera to capture imagery within a field-of-view (FOV) in a pointing direction in the local scene to generate a sequence of frames to form the video signal;
    buffering the sequence of frames for a specified time-delay;
    processing the buffered sequence of frames to recognize disallowed object;
    in response to recognition of at least one of the disallowed objects prior to expiration of the time-delay, controlling the buffered sequence of frames by turning the video camera off to prevent transmission of any frame including the disallowed object in the video signal; and
    if there is no recognition of at least one of the disallowed objects prior to expiration of the time-delay, then transmitting the sequence of frames after the expiration of the time-delay;
    wherein controlling the buffered sequence includes turning the video camera off.

15. The method of claim 1, wherein controlling the buffered sequence includes blanking frames that include the at least one of the disallowed objects in the video signal.

16. A method of preventing transmission of excluded data in a local scene from a transmitted video signal, said method comprising:
    using a video camera to capture imagery within a field-of-view (FOV) in a pointing direction in the local scene to generate a sequence of frames to form the video signal;
    buffering the sequence of frames for a specified time-delay;
    processing the buffered sequence of frames to recognize disallowed object;
    in response to recognition of at least one of the disallowed objects prior to expiration of the time-delay, controlling the buffered sequence of frames by flushing the buffer to remove all of the frames currently in the buffer from the video signal to prevent transmission of any frame including the disallowed object in the video signal; and
    if there is no recognition of at least one of the disallowed objects prior to expiration of the time-delay, then transmitting the sequence of frames after the expiration of the time-delay.

17. The method of claim 1, wherein controlling the buffered sequence includes obscuring the at least one of the disallowed objects in the frames in which it occurs.

18. A method of preventing transmission of excluded data in a local scene from a transmitted video signal, said method comprising:
    providing a Ground Truth Map (GTM) specifically tailored to the local scene, said GTM including a library of disallowed objects that are present in the scene;
    using a video camera to capture imagery within a field-of-view (FOV) in a pointing direction in the local scene to generate a sequence of frames to form the video signal;
    buffering the sequence of frames for a specified time-delay of at most 42 ms;
    processing each buffered frame with an object recognition algorithm to identify candidate objects;
    comparing the candidate objects against the library of disallowed objects to determine whether each frame includes the disallowed object;
    in response to recognition of at least one of the disallowed objects prior to expiration of the time-delay, issuing an interrupt to flush the buffer to remove all of frames currently in the buffer from the video signal; and
    if there is no recognition of at least one of the disallowed objects prior to expiration of the time delay, then transmitting the sequence of frames after the expiration of the time-delay.

19. A system for preventing transmission of excluded data in a local scene from a transmitted video signal, said system comprising:
    a video camera configured to capture imagery within a field-of-view (FOV) in a pointing direction in the local scene to generate a sequence of frames to form the video signal;
    a buffer configured to buffer the sequence of frames for a specified time-delay;
    one or more processors configured to process the buffered sequence of frames to recognize a disallowed object;
    in response to recognition of at least one of the disallowed objects prior to expiration of the time-delay, an interrupt processor configured to control the buffered sequence of frames to prevent transmission of any frame including the disallowed object in the video signal; and
    if there is no recognition of at least one of the disallowed objects prior to expiration of the time-delay, a transmitter configured to transmit the sequence of frames after the expiration of the time-delay
    wherein the one or more processors are configured to measure a rate of motion of an object entering the local scene, and, if the measured rate exceeds a maximum value, to issue an interrupt to prevent transmission of the buffered sequence of frames.

* * * * *